United States Patent [19]

Hauner

[11] Patent Number: 5,486,222
[45] Date of Patent: Jan. 23, 1996

[54] SINTERED COMPOSITE MATERIALS FOR ELECTRIC CONTACTS IN POWER TECHNOLOGY SWITCHING DEVICES AND PROCESS FOR PRODUCING THEM

[75] Inventor: Franz Hauner, Röttenbach, Germany

[73] Assignee: Siemens Aktiengesellschaft, Munich, Germany

[21] Appl. No.: 256,643

[22] PCT Filed: Jan. 22, 1993

[86] PCT No.: PCT/DE93/00052

§ 371 Date: Jul. 18, 1994

§ 102(e) Date: Jul. 18, 1994

[87] PCT Pub. No.: WO93/15517

PCT Pub. Date: Aug. 5, 1993

[30] Foreign Application Priority Data

Jan. 24, 1992 [DE] Germany .......................... 42 01 940.0

[51] Int. Cl.⁶ ................................................. C22C 29/12
[52] U.S. Cl. .................. 75/232; 75/233; 75/234
[58] Field of Search ............... 75/232, 233, 234; 148/431; 419/21, 28, 32

[56] References Cited

U.S. PATENT DOCUMENTS

| | | | |
|---|---|---|---|
| 4,242,135 | 12/1980 | Shibata | 148/431 |
| 4,514,238 | 4/1985 | Shibata | 148/431 |
| 4,551,301 | 11/1985 | Schreiner | 419/21 |
| 4,810,289 | 3/1989 | Hoyer et al. | 75/232 |
| 4,855,104 | 8/1989 | Rothkegel et al. | 419/28 |
| 4,859,238 | 8/1989 | Wiese et al. | 75/233 |
| 4,948,424 | 8/1990 | Haufe et al. | 75/234 |
| 4,980,125 | 12/1990 | Haufe et al. | 419/21 |
| 5,330,702 | 7/1994 | Kippenberg et al. | 419/28 |

FOREIGN PATENT DOCUMENTS

| | | |
|---|---|---|
| 0118717 | 9/1984 | European Pat. Off. |
| 0164664 | 12/1985 | European Pat. Off. |
| 0170812 | 2/1986 | European Pat. Off. |
| 2659012 | 5/1979 | Germany |
| 2924238 | 12/1979 | Germany |

*Primary Examiner*—Donald P. Walsh
*Assistant Examiner*—John N. Greaves
*Attorney, Agent, or Firm*—Kenyon & Kenyon

[57] ABSTRACT

Contact materials with the composition $AgSnO_2Bi_2O_3CuO$ have proven themselves, particularly for low-voltage switching devices. These materials can contain an additive of other metal oxides. In addition to the required useful lifetime and suitable excess high temperature behavior, such materials are also supposed to fulfill all the requirements under short-circuit current stress. This is accomplished, according to the invention, in that the additional metal oxide is separately added stannic oxide and/or iron containing at least one element of the sixth sub-group of the periodic system. In the sintered composite material according to the invention, the other metal oxide is particularly ferric tungstate ($FeWO_4$). Preferably, separately added $SnO_2$ is present in combination with $FeWO_4$. To produce such a sintered composite material, an internally oxidized alloy powder is produced from an AgSnBiCu alloy and mixed with the powder of the additional metal oxide or metal oxides, and the powder mixture is processed to yield molded elements with a residual porosity of less than 1.5%, using production steps from sintering technology.

18 Claims, 1 Drawing Sheet

SINTERED COMPOSITE MATERIALS FOR ELECTRIC CONTACTS IN POWER TECHNOLOGY SWITCHING DEVICES AND PROCESS FOR PRODUCING THEM

FIELD OF THE INVENTION

The invention relates to sintered composite materials for electric contacts in Dower technology switching devices, particularly for low-voltage switching devices, having a $AgSnO_2Bi_2O_3CuO$ composition and, if necessary, other metal oxides. In addition, the invention also relates to a process for manufacturing such a sintered composite materials.

BACKGROUND OF THE INVENTION

Materials made of silver, stannic oxide, bismuth oxide and copper oxide have proven themselves, particularly for low-voltage switching devices. These materials fully satisfy requirements with regard to useful lifetime, on one hand, and high temperature behavior, on the other hand. The useful lifetime, in particular, is determined by contact combustion loss and by welding behavior during switching operations, while the high temperature behavior is, in particular, determined by contact resistance. For example, the materials are known from EP-A-0 164 664 and EP-A-0 170 812, with $AgSnO_2Bi_2O_3CuO$ compositions. These references relate specifically to such compositions for which the high temperature behavior is optimized. The known materials are normally produced by internal oxidation to internally oxidized alloy powders. In this connection, other metal oxides can also be added to the internally oxidized alloy powder.

The known materials are also supposed to satisfy short-circuit current stress requirements. Specifically, for testing under short-circuit current conditions (i.e., at currents which lie significantly above the normal current stress of the network) for which VDE and IEC standards exist for an individual case, the contacts are not allowed to weld in contactors for a specified range of pre-fuses, i.e., any welding which occurs must be easily broken T.

SUMMARY OF THE INVENTION

It is therefore an object of the invention to find a sintered composite material with a $AgSnO_2Bi_2O_3CuO$ composition which is improved with regard to its short-circuit current behavior.

This task is accomplished, according to the invention, in that in a material of the type stated above, the additional metal oxide mixed in separately is stannic oxide and/or iron containing at least one element of the sixth sub-group of the periodic table. In the sintered composite material according to the invention, the additional metal oxide is, in particular, ferric tungstate. Preferably, a combination of added stannic oxide and ferric tungstate is present.

It is true that a sintered composite material which consists of silver, stannic oxide, bismuth oxide and copper oxide, which additionally contains tungsten oxide and/or molybdenum oxide as a sublimating metal oxide additive, as well as a process for producing this material are all ready known from EP-B-0 118 717. Here, the stannic oxide, the bismuth oxide and the copper oxide are precipitated as globular precipitates in silver in structural regions up to maximum 200 μm diameter. Whereas the sublimating metal oxide additive of tungsten oxide and/or molybdenum oxide is distributed at the surfaces of the border areas of these silver regions. This material is produced in that an alloy powder of AgSnBiCu with a predetermined composition is internally oxidized to form an $AgSnO_2Bi_2O_3CuO$ composite powder, the composite powder is mixed with $WO_3$ and/or $MoO_3$ powder in a predetermined amount, in a stirrer mill, in the presence of acetone, and the $WO_3$ and/or $MoO_3$ powder particles are distributed on the surface of the composite powder particles of $AgSnO_2Bi_2O_3CuO$.

However, the above known materials still do not fulfill the above shorten requirements in an adequate manner. In contrast, the short-circuit behavior of the known sintered composite $AgSnO_2Bi_2O_3CuO$ materials is surprisingly improved by the addition of separate $SnO_2$ and/or $FeWO_4$, which is particularly evident in the non-welding behavior of these materials in the event of short-circuit, even when using higher fuse current strengths.

Within the scope of the invention, the proportion of the amount of separately added stannic oxide lies at up to 6% by mass, and that of ferric tungstate in at up to 3% by mass. The material preferably has a mass ratio of separately added stannic oxide below 3%, particularly below 1.5% by mass $SnO_2$, and has a mass ratio of ferric tungstate below 1.5%, particularly below 0.5% by mass $FeWO_4$. For example, a combination of a 1% by mass portion of $SnO_2$ and a 0.04% by mass portion of $FeWO_4$ as additional metal oxides is possible. With such additives, materials with an $AgSnO_2Bi_2O_3CuO$ composition having stannic oxide contents of 3 to 12.5 mass %, bismuth oxide contents of 0.5 to 4 mass %, and copper oxide contents of 0.3 to 1 mass % can be improved in terms of their short-circuit resistance, without worsening the other material properties.

Within the scope of the invention, the material according to the invention is produced from an internally oxidized alloy powder that is produced from an AgSnBiCu alloy with a predetermined concentration. This powder is mixed with a predetermined amount of a powder of the other metal oxide or metal oxides, and the powder mixture is processed to yield a molded element with a residual porosity of less than 1.5%, using production steps available from sintering technology. Mixing of the $AgSnO_2Bi_2O_3CuO$ powder with the $SnO_2$ and/or $FeWO_4$ powder takes place in a stirrer ball mill, with the addition of organic substances.

Further advantages and details of the invention are evident from the following: Description of examples, with reference being made to two tables.

BRIEF DESCRIPTION OF THE TABLES AND THE FIXTURES

Table 1 shows the results of a preliminary evaluation of different materials,

Table 2 shows the results of measurements based on IEC test regulations, and

FIGS. 1 to 3 show structural photographs of different materials at 100×magnification (1 cmΔ100 μm), with the effective switching structure being visible in each instance.

DETAILED DESCRIPTION OF THE PREFERRED EMBODIMENTS

Figure 1:
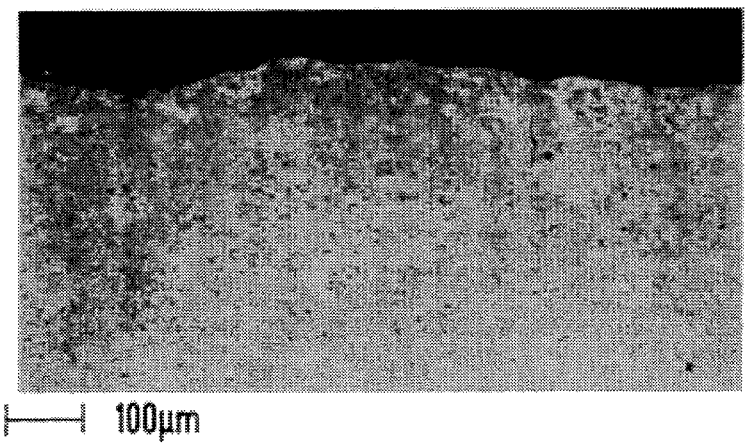

Sintered composite materials with a $AgSnO_2Bi_2O_3CuO$ composition can be produced according to a method for the internal oxidation of alloy powders—the so-called IOLP method. For this purpose, alloys of AgSnBiCu with a predetermined composition are melted, and the melt produced in this way is atomized to form an alloy powder by means of pressure atomization. The alloy powder can be transformed to a composite powder by means of thermal treatment, with complete internal oxidation.

A suitable amount of a ferric tungstate powder produced separately is mixed into the composite powder produced in this way. Mixing can take place, for example, in a stirrer ball mill, with the addition of organic substances.

After the powder mixture has dried, a molded element is produced by means of pressing, sintering and post-compacting; this mobled element has a residual porosity of less than 1.5%. The contact properties, such as combustion loss, welding force and contact resistance, are measured in a test switch. In addition, on the hand, the lifetime switching number is determined in a long-term test in the switching device, and on the other hand, the excess temperature behavior is also determined.

Over and above the known tests, the welding behavior of the contact materials described here is tested under short-circuit current and compared with the welding behavior of the known $AgSnO_2$ contact materials. For this purpose, a test contactor having a rated current of 250 A was first used for preliminary tests with a short-circuit current having a peak value of 10 kA establishes over 10 half-waves.

Table 1 gives three groups of materials. The first (Group I) relates to materials with the composition $AgSnO_2Bi_2O_3CuO$ at different concentrations. In the second group (Group II), $WO_3$ or $MoO_3$ additives are alternatively added to these materials. While third group (Group III) specifically contains ferric tungstate as the additive.

Table 1 shows that in the Groups I and II, all the materials weld under short-circuit current the first time they are switched. In contrast, for the materials of Group III, no welding was observed even after three switchings under short-circuit current. Since these materials also fulfill the requirements with regard to lifetime and high temperature behavior, they appear suitable for use in the contact pieces of low-voltage switching devices.

Furthermore, the short-circuit behavior was tested for various materials using a 55 kW test contactor. So-called NH fuses were used as the pre-fuses in this connection. The maximum fuse current strength at which the switching contacts do not weld is used as the measure for the short-circuit resistance of the material.

Table 2 represents three different materials according to the invention corresponding to Group III of Table 1, in addition to materials corresponding to Group I of Table 1. The tests showed that the materials according to the invention corresponding to Group III each tolerate a higher current strength than the comparison material, without welding. In particular, it was shown that the addition of separately added stannic oxide, on the one hand, or ferric tungstate, on the other hand, has approximately the same influence on the short-circuit current behavior. A combination of separately added stannic oxide and ferric tungstate improves the welding current behavior an optimum manner.

The latter improvements can be explained by the switching structure: known $AgSnO_2Bi_2O_3CuO$ composite materials related to Group I of Tables 1 and 2 show a structure of silver particles with $SnO_2$, $Bi_2O_3$ and $CuO$ particles. In the narrow zone of the switching structure, practically no zones are evident.

Figure 2:
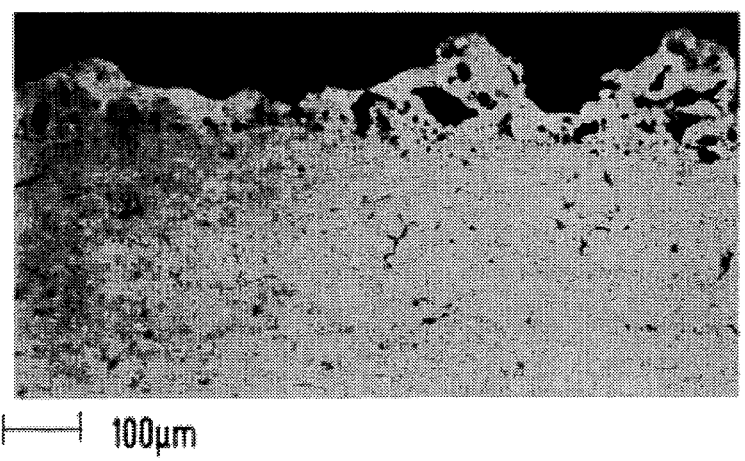
Figure 3:
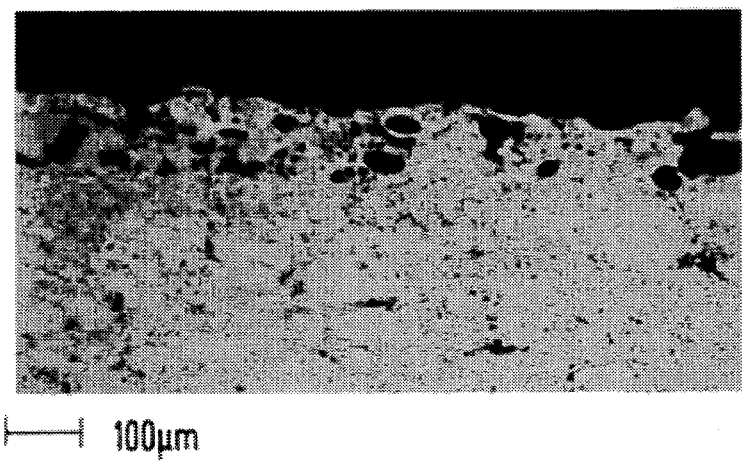

FIG. 2 shows a material corresponding to Group III of Table 2, which has the composition $AgSnO_2Bi_2O_3CuO+SnO_2$, and FIG. 3 shows a material corresponding to Group III of Table 2, which has the composition $AgSnO_2Bi_2O_3CuO+SnO_2+FeWO_4$. In both cases, the concentration of the stannic oxide ($SnO_2$) in the internally oxidized alloy powder has a concentration of 6.5%. In the first case, 1% $SnO_2$ was added, in the second case, 1% $SnO_2+0.4$ % $FeWO_4$ was added. Both materials were subjected to the same short-circuit current stress.

In FIG. 2, the zone of the switching structure is broader than in FIG. 1, and numerous pores are present. This structure has the effect that, in spite of high short-circuit currents, welding of the contacts does not occur or at least that the welds are easy to break up.

In FIG. 3, more and larger pores can be seen than in FIG. 2. As a result, this material is particularly advantageous with regard to the short-circuit current behavior.

TABLE 1

Preliminary experiments on the welding behavior of $AgSnO_2$ contact materials under short-circuit current (test contactor for 250 A rated current; short-circuit current with peak value of 10 kA, current flow duration 10 half-waves)

| | Material | Result |
|---|---|---|
| I | $AgSnO_2 6.5 Bi_2O_3 0.7 CuO 0.7$ | welded at 1st switching |
| | $AgSnO_2 8 Bi_2O_3 1 CuO 1$ | welded at 1st switching |
| | $AgSnO_2 9.5 Bi_2O_3 1 CuO 1$ | welded at 1st switching |
| II | $AgSnO_2 6.5 Bi_2O_3 0.7 CuO 0.7 + 0.4\% WO_3$ | welded at 1st switching |
| | $AgSnO_2 8 Bi_2O_3 1 CuO 1 + 0.4\% MoO_3$ | welded at 1st switching |
| III | $AgSnO_2 6.5 Bi_2O_3 0.7 CuO 0.7 + 0.4\% FeWO_4$ | not welded after 3 switchings |
| | $AgSnO_2 8 Bi_2O_3 1 CuO 1 + 0.4\% FeWO_4$ | not welded after 3 switchings |

TABLE 2

Testing of Short-Circuit Behavior (55 kW test contactor for 110 A rated current, short-circuit current with peak value of 5 kA, current flow duration 5 half-waves)

| | Material | Fuse current strength | Fuse melted | Result |
|---|---|---|---|---|
| I | $AgSnO_2 6.5 Bi_2O_3 0.7 CuO 0.7$ | 200 A | yes | not welded |
| | | 224 A | yes | welded but easy to break up |
| III | $AgSnO_2 6.5 Bi_2O_3 2 CuO 0.7 +$ 0.4% $FeWO_4$ | 224 A | yes | not welded |
| | | 250 A | yes | welded but easy to break up |
| | $AgSnO_2 6.5 Bi_2O_3 2 CuO 0.7 +$ 1% $SnO_2$ | 224 A | yes | not welded |
| | | 250 A | yes | not welded |
| | | 315 A | no | welded |
| | $AgSnO_2 6.5 Bi_2O_3 2 CuO 0.7 +$ 1% $SnO_2$ + 0.4% $FeWO_4$ | 224 A | yes | not welded |
| | | 250 A | yes | not welded |
| | | 400 A | no | welded |

I claim:

1. A sintered composite material for electric contacts comprising an $AgSnO_2Bi_2O_3CuO$ base composition with a separately added metal oxide selected from stannic oxide ($SnO_2$), an oxide of iron and at least one element from group VIB of the periodic table of elements, and a mixture of stannic oxide and an oxide of iron and at least one element from group VIB of the periodic table of elements.

2. The sintered composite material according to claim 1, wherein said separately added metal oxide is stannic oxide provided in a mass ratio of less than 6 wt %.

3. The sintered composite material according to claim 1, wherein said separately added metal oxide is stannic oxide provided in a mass ratio of less than 3 wt %.

4. The sintered composite material according to claim 1, wherein said separately added metal oxide is stannic oxide provided in a mass ratio of less than 1.5 wt %.

5. The sintered composite material according to claim 1, wherein said separately added metal oxide is ferric tungstate ($FeWO_4$).

6. The sintered composite material according to claim 5, wherein said ferric tungstate ($FeWO_4$) is provided in a mass ratio of less than 3%.

7. The sintered composite material according to claim 5, wherein said ferric tungstate ($FeWO_4$) is provided in a mass ratio of less than 1.5%.

8. The sintered composite material according to claim 5, wherein said ferric tungstate ($FeWO_4$) is provided in a mass ratio of less than 0.5%.

9. The sintered composite material according to claim 1, wherein said separately added metal oxide is a mixture of stannic oxide provided in a mass ratio of less than 6 wt % and ferric tungstate ($FeWO_4$) provided in a mass ratio of less than 3%.

10. The sintered composite material according to claim 1, wherein said $AgSnO_2Bi_2O_3CuO$ base composition comprises 3 to 12.5 mass % stannic oxide ($SnO_2$), 0.5 to 4 mass % bismuth oxide ($Bi_2O_3$), 0.3 to 1 mass % copper oxide (CuO) and the remainder silver (Ag).

11. The sintered composite material according to claim 10, wherein said separately added metal oxide is stannic oxide provided in a mass ratio of less than 6 wt %.

12. The sintered composite material according to claim 10, wherein said separately added metal oxide is ferric tungstate ($FeWO_4$) provided in a mass ratio of less than 3%.

13. The sintered composite material according to claim 10, wherein said separately added metal oxide is a mixture of stannic oxide provided in a mass ratio of less than 6 wt % and ferric tungstate ($FeWO_4$) provided in a mass ratio of less than 3%.

14. The sintered composite material according to claim 11, characterized by the composition $AgSnO_2 6.5 Bi_2O_3 0.7 CuO 0.7 + SnO_2 1$.

15. The sintered composite material according to claim 12, characterized by the composition $AgSnO_2 6.5 Bi_2O_3 0.7 CuO 0.7 + FeWO_4 0.4$.

16. The sintered composite material according to claim 12, characterized by the composition $AgSnO_2 8 Bi_2O_3 1 CuO 1 + FeWO_4 0.4$.

17. Sintered composite material according to claim 12, characterized by the composition $AgSnO_2 6.5 Bi_2O_3 2 CuO 0.7 + FeWO_4 0.4$.

18. Sintered composite material according to claim 13, characterized by the composition $AgSnO_2 6.5 Bi_2O_3 0.07 CuO 0.7 + SnO_2 1 + FeWO_4 0.4$.

* * * * *